US008494932B2

(12) United States Patent
Shen

(10) Patent No.: US 8,494,932 B2
(45) Date of Patent: Jul. 23, 2013

(54) FLUID FLOW MEASUREMENT SYSTEM

(75) Inventor: David Chun-Hao Shen, Washington, DC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/051,087

(22) Filed: Mar. 18, 2011

(65) Prior Publication Data

US 2012/0239539 A1  Sep. 20, 2012

(51) Int. Cl.
*G01F 1/66* (2006.01)
(52) U.S. Cl.
USPC ............... 705/34; 702/48; 364/510; 700/283
(58) Field of Classification Search
USPC ................................ 705/34; 702/48; 364/510
See application file for complete search history.

(56) References Cited

U.S. PATENT DOCUMENTS

| | | | | |
|---|---|---|---|---|
| 4,164,865 A | * | 8/1979 | Hall et al. | 73/861.28 |
| 4,372,166 A | * | 2/1983 | Loveland | 73/861.28 |
| 4,888,706 A | * | 12/1989 | Rush et al. | 700/283 |
| 7,562,584 B2 | * | 7/2009 | Conquergood | 73/861 |
| 2006/0225514 A1 | | 10/2006 | Conquergood | |
| 2012/0061967 A1 | * | 3/2012 | Chaganti et al. | 290/52 |

FOREIGN PATENT DOCUMENTS

| | | |
|---|---|---|
| EP | 0145170 A1 | 6/1985 |
| EP | 0172676 A1 | 2/1986 |
| EP | 0932029 A2 | 7/1999 |

OTHER PUBLICATIONS

O&M Best Practices Guide, Release 3.0, Chapter 8, Metering for Operations and Maintenance, Aug. 2010, pp. 8.1-8.18.

* cited by examiner

*Primary Examiner* — Vanel Frenel
(74) *Attorney, Agent, or Firm* — John Pivnichny

(57) ABSTRACT

Sub-metering of fluid use is performed using a single acoustic transducer positioned at a common supply point. A computer attached to the transducer determines when each consumption point is active and measures the respective amount of fluid drawn by each. Acoustic signatures of each consumption point differ depending on the length of piping runs, location of elbows, tees, and other structures which cause acoustic energy as the fluid flows through. The acoustic signatures are recorded by the computer and are used to simultaneously differentiate fluid use at each consumption point.

16 Claims, 2 Drawing Sheets

FLUID FLOW MEASUREMENT SYSTEM

BACKGROUND OF THE INVENTION

1. Field of the Invention

The invention relates generally to measurements of fluid flow in a complex system of pipes for distribution to a plurality of consumers. More particularly, the invention relates to use of a single acoustic transducer coupled to a processor for measuring fluid consumption by a plurality of consumers, such as those residing in an apartment building.

2. Description of the Related Art

Various acoustic transducers have been developed for measuring fluid flow in a pipe. For example, Gutterman in European Patent Application EP 0145170 describes a dual frequency acoustic fluid flow method and apparatus. Gutterman also describes in EP 0172676 an acoustic fluid flow meter using a pair of ultrasonic transducers mounted on one wall of a conduit and an opposite reflective wall shaped to focus acoustic signals from one transducer to the other.

Wallen in European Patent Application EP 0932029 describes an acoustic flow meter based on determining upstream and downstream transit times of acoustic pulses transmitted between acoustic signal transceivers.

Conquergood, in U.S. Pat. No. 7,562,584, describes acoustic fluid flow measurement, which processes amplified microphone signals with a signal processor. After processing, the signals may be transmitted wirelessly to a remote site for further processing.

BRIEF SUMMARY OF THE INVENTION

Installation of sub-metering devices in existing buildings such as multi-family residences is very expensive in terms of labor and hardware. There is also the cost and inconvenience associated with suspension of utility services while the installation of multiple metering devices is being performed. If all of the sub-meters are to be located at a single point, such as a meter closet or meter room, additional plumbing of pipe runs will typically be needed regardless of whether the structure is an existing one or a new construction.

In accordance with the present invention, fluid use at a plurality of consumption points is detected and measured by a single acoustic transducer located at a single metering point. The sensor detects acoustic signatures unique to the flow of the fluid as it passes through existing piping within the structure. The acoustic transducer is coupled directly or remotely to a computer processor, which analyzes the acoustic signals from the transducer. The processor can differentiate, therefrom, fluid use at each consumption point in the structure.

DETAILED DESCRIPTION OF THE INVENTION

Figure 1:
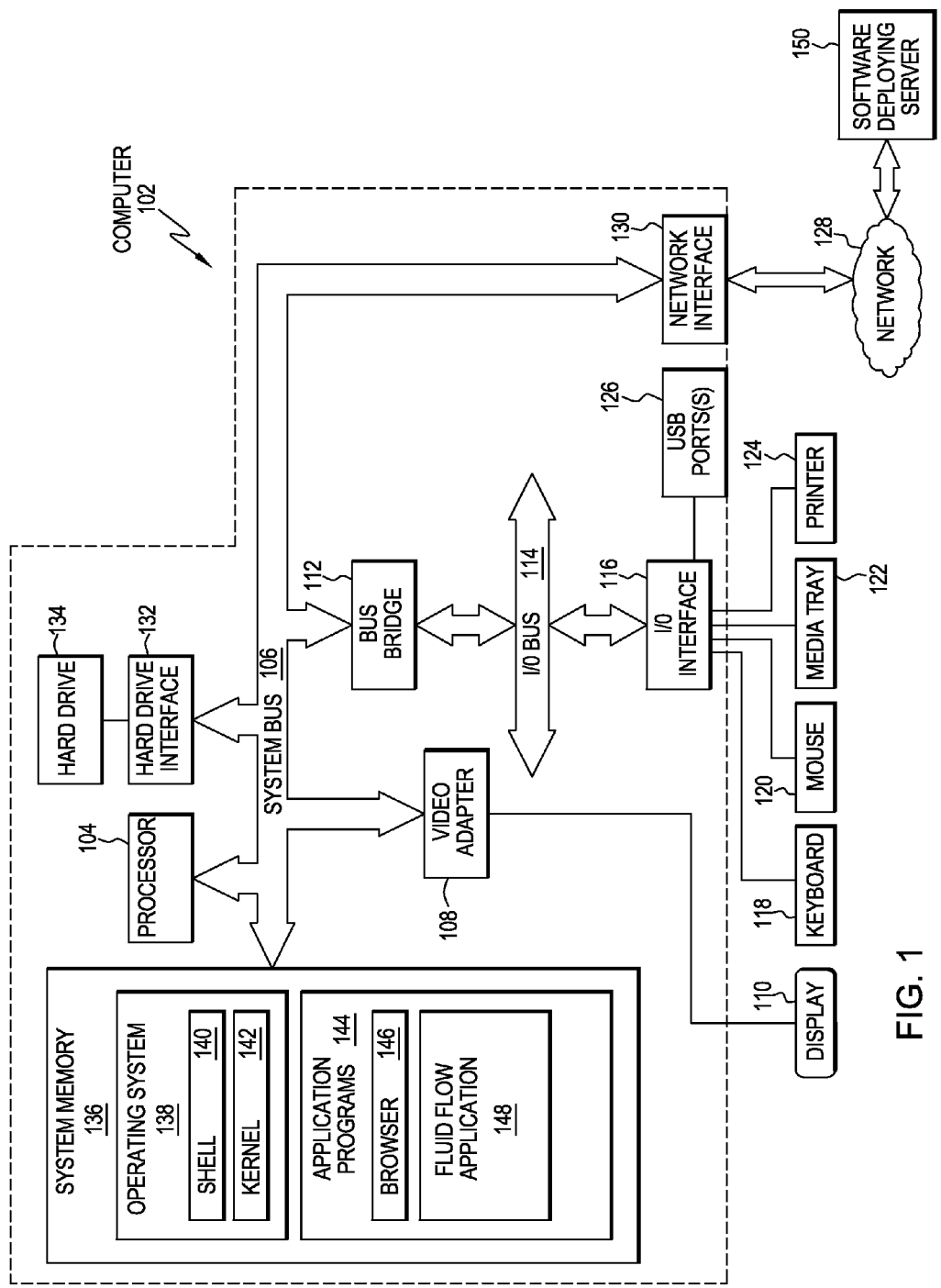
FIG. 1 depicts an exemplary computer which may be used in the present invention.

For a better understanding of the present invention, together with further objects, advantages and capabilities thereof, reference is made to the following disclosure and the appended claims in connection with the above-described drawings.

As will be appreciated by one skilled in the art, aspects of the present invention may be embodied as a system or computer program product. Accordingly, aspects of the present invention may take the form of an entirely hardware embodiment, and entirely software embodiment (including firmware, resident software, micro-code, etc.) or an embodiment combining software and hardware aspects that may all generally be referred to herein as an "apparatus" "module" or "system." Furthermore aspects of the present invention may take the form of a computer program product embodied in one or more computer readable storage mediums(s) having computer readable program code embodied thereon.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a fluid flow application 148. This includes code for implementing the processes described below, including those described in FIGS. 2-3. In one embodiment, computer 102 is able to download application 148 from software deploying server 150, including in an on-demand basis, wherein the code in application 148 is not downloaded until needed for execution to define and/or implement the invention described herein. Note further that, in one embodiment of the present invention, software deploying server 150 performs all of the functions associated with the present invention, thus freeing computer 102 from having to use its own internal computing resources to execute application 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
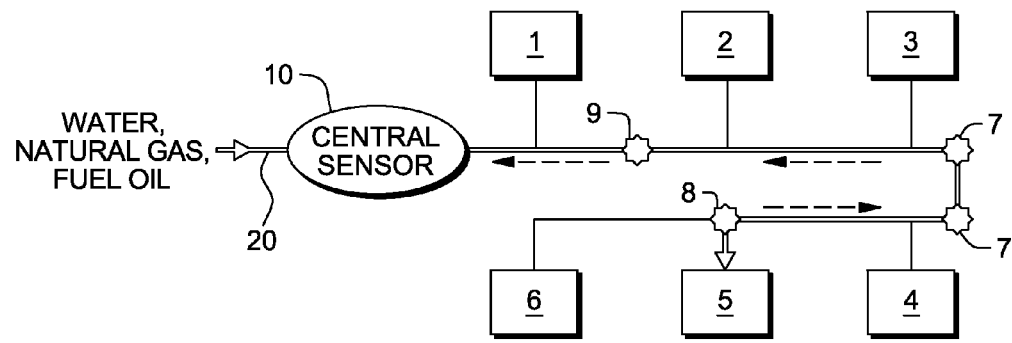
FIG. 2 is a diagram of a fluid distribution system having a single acoustic transducer in accordance with the present invention.

In FIG. 2, there is shown a diagram of fluid distribution system. Any type of fluid enters pipe 20, which distributes it to consumption points 1-6. Ninety degree elbows 7, tee 8, or straight pipe runs 9 may be used in the piping to reach consumption points 1-6. Any other type of piping structure or components, such as unions, reduction fittings or the like known in the art may be used.

Consumption points 1-6 may be individual apartments within a multi-family building, however any facility having multiple branches of piping carrying a fluid may use the present invention to advantage. The term fluid, as used here shall be taken to have its normal dictionary meaning of a liquid or a gas. Examples of fluids which may be used with the present invention include but are not limited to water, natural gas, fuel oil, compressed air, and beverages.

A single acoustic transducer sensor 10 is located at the source point where the fluid enters the piping. Any type of acoustic sensor or transducer known in the art may be used. This includes but is not limited to the devices of Gutterman, Wallen, and Conquergood noted above. Acoustic sensor 10 is coupled directly or remotely to a computer 102 for processing of the acoustic signals of sensor 10. Such coupling may be directly via USB port 126, or any other computer attachment port (not shown) known in the art, the coupling may also be remote over network interface 130, whether by a hardware connection or wireless, infrared, WiFi, radio, or any other remote connection means known in the art.

As each of consumption points 1-6 draws fluid, acoustic signals are generated as the fluid passes through 90 degree elbows 7, or tee 8, or even straight pipe runs 9, which are unique to each of consumption points 1-6 because of differing pipe lengths between such structures, consumption points, and acoustic sensor 10. Computer 102 is therefore able to differentiate in most cases draw of the fluid by each consumption point. Furthermore, computer 10 can differentiate simultaneous draw by more than one consumption point.

The manner in which computer 102 makes such differentiation is as follows. An acoustic signature is taken for each consumption point separately using the single acoustic sensor 10. The signature includes a recording of the acoustic signal for each consumption point at various usage levels (flow rates). The recording may be digitized levels of the acoustic signal from sensor 10 over an appropriate time.

Acoustic signatures are inherent to the geometry of the piping arrangement. Combinations of bends, tees, and elbows can result in unique acoustic signatures. The system can differentiate such signatures through initial calibration. In the event signatures cannot be differentiated through passive acoustic signatures, then emitters—each with preprogrammed unique frequencies—can be placed non-invasively at key points in the piping system.

When piping structure symmetries exist, differentiation between consumption points may be difficult. It may not be possible to differentiate individual signatures. In that case, one or more acoustic emitters 17 may be positioned at consumption points.

Figure 3:
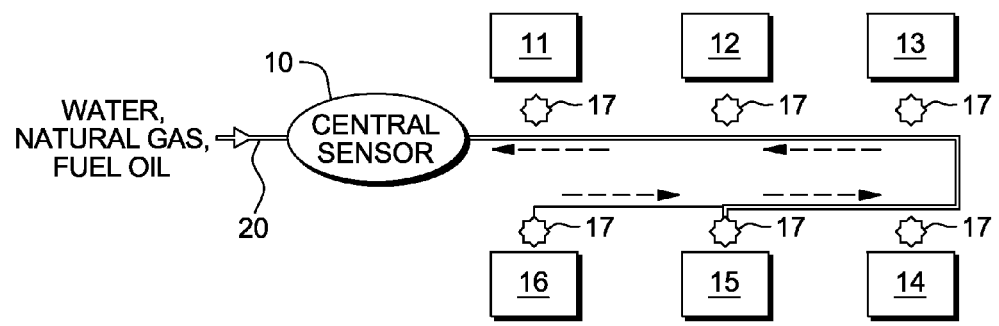
FIG. 3 is a diagram of a fluid distribution system having a plurality of acoustic emitters.

In FIG. 3, there is shown acoustic emitters 17 placed at consumption points 11-16. It is not necessary to have an emitter at each consumption point, merely where differentiation is difficult. The emitter device reads a unique sonic signal which is modified primarily by the flow drawn by the respective consumption point. The sonic signal from an emitter may also be modified by flow at other consumption points. However, the modifications will usually differ due to differing piping lengths, elbows, and other structures, so that computer 102 is able to sufficiently differentiate signatures with the active acoustic emitter, which were not previously differentiated based on piping length, elbows, and other passive structures alone.

It will be obvious to those skilled in the art that computer 102 may thereafter send a bill to each apartment owner or to whoever is responsible for each consumption point. The dollar amount of the bill may be related to the amount of fluid drawn at that particular consumption point over a period of time, such as monthly.

In one embodiment of the invention, computer 102 stores several acoustic signatures for each consumption point at various known draw levels.

The stored signatures may be determined by analysis of the signal from acoustic transducer 10. For example, Fourier analysis or other frequency domain techniques may be used to compute and store as a signature the signal energy level, amplitude and phase at numerous frequency points. Other signature methods known in the art may also be used. Each consumption point will have a unique signature for each draw level. As noted above, in the case where two signatures resulting from acoustic energy produced passively by the flow of fluid through elbows, tees, straight runs, and other structures, cannot be distinguished, an active acoustic emitter can be positioned at one or more of the consumption points, causing differing acoustic energy from such structures to enhance distinguishability of the respective signatures.

Computer 102, having the stored signatures is able to thereafter simultaneously determine the flow rates at all consumption points. Such a determination may be made using a linear programming algorithm. Other matching algorithms may also be used.

In one embodiment, one or more of the acoustic emitters 17 may be remotely activated or deactivated by computer 102. For example, emitter 17 may be deactivated during periods of low draw and activated only when needed to reduce power consumption of the acoustic emitter, or for any other reason. Activation may be implemented through a wireless link or by direct connection via wires.

While there have been shown and described what are at present considered the preferred embodiments of the invention, it will be obvious to those skilled in the art that various changes and modifications may be made therein without departing from the scope of the invention as defined by the appended claims.

What is claimed is:

1. A system for sub-metering utility use, comprising:
   interconnected fluid distribution pipes having a plurality of consumption points and a single source of supply;
   an acoustic transducer positioned at said single source of supply;
   a processor attached to said transducer for simultaneously determining which of said consumption points are actively consuming said fluid and measuring the rates of consumption at each of said consumption points based on acoustic signals received by said transducer.

2. The system of claim 1, further comprising one or more active acoustic emitters positioned at one or more of said consumption points.

3. The system of claim 2, further comprising instructions running on said processor for billing a plurality of customers based respectively on said determining and measuring of the rates of consumption at each of said consumption points.

4. The system of claim 1, wherein said acoustic transducer is attached to said pipe at said single source of supply.

5. The system of claim 1, wherein said one or more acoustic emitters are attached to said pipe at said one or more of said consumption points.

6. The system of claim 5, wherein said one or more acoustic emitters may be remotely activated or deactivated by said processor.

7. The system of claim 6, wherein said remotely activated or deactivated comprises a wireless link.

8. The system of claim 1, further comprising a fluid within said pipes and wherein said fluid comprises water, fuel oil, natural gas or compressed air.

9. The system of claim 1, wherein said plurality of consumption points are receptive dwelling units in a multi residence building.

10. A method of sub-metering utility use, comprising the steps of:
    providing interconnected fluid distribution pipes having a plurality of consumption points and a single source of supply;
    positioning an acoustic transducer at said single source of supply;
    determining which point of said consumption points are actively consuming said fluid and measuring the rate of consumption at each of said consumption points using a processor attached to said acoustic transducer, based on acoustic signals received by said transducer.

11. The method of claim 10, further comprising the step of positioning one or more active acoustic emitters at one of more of said consumption points.

12. The method of claim 10, further comprising the step of billing a plurality of customers based respectively on said determining and measuring of the rate of consumption at each of said consumption points.

13. The method of claim 10, wherein said acoustic transducer is attached to said pipe at said source of supply.

14. The method of claim 10, wherein said one or more acoustic emitters are attached to said pipe at said one or more of said consumption points.

15. The method of claim 10, wherein said fluid comprises water, fuel oil, natural gas, or compressed air.

16. The method of claim 10, wherein said plurality of consumption points are respective dwelling units in a multi-residence building.

* * * * *